United States Patent
Hori et al.

(10) Patent No.: US 10,307,952 B2
(45) Date of Patent: Jun. 4, 2019

(54) CYLINDRICAL EXTRUDING DIE AND METHOD FOR PRODUCING SEAMLESS TUBE

(71) Applicant: CANON KABUSHIKI KAISHA, Tokyo (JP)

(72) Inventors: Takayuki Hori, Kawasaki (JP); Masaaki Takahashi, Yokohama (JP); Masayuki Morohashi, Kawasaki (JP); Akira Yane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 15/254,809

(22) Filed: Sep. 1, 2016

(65) Prior Publication Data
US 2017/0066173 A1    Mar. 9, 2017

(30) Foreign Application Priority Data
Sep. 7, 2015 (JP) ................. 2015-175496

(51) Int. Cl.
*B29C 47/20* (2006.01)
*B29C 47/00* (2006.01)
(Continued)

(52) U.S. Cl.
CPC ............. *B29C 47/20* (2013.01); *B29B 7/325* (2013.01); *B29B 7/582* (2013.01); *B29B 7/82* (2013.01);
(Continued)

(58) Field of Classification Search
CPC ........ B29C 47/20; B29C 47/362; B29B 7/325
See application file for complete search history.

(56) References Cited

U.S. PATENT DOCUMENTS 4,574,067 A * 3/1986 Cerny ................... B29C 47/265
                                                            264/209.8
4,814,130 A * 3/1989 Shiromatsu ........... B29C 47/367
                                                            264/171.19
(Continued)

FOREIGN PATENT DOCUMENTS

JP         H11170340 A     6/1999

*Primary Examiner* — Austin Murata
(74) *Attorney, Agent, or Firm* — Canon U.S.A., Inc. IP Division

(57) ABSTRACT

A method for producing an electrically conductive seamless tube includes (1) preparing an electrically conductive resin composition containing a thermoplastic resin and an electrically conductive filler, (2) preparing a cylindrical extruding die including a cylindrical slit, at least one circumferential distribution channel communicating with the slit and distributing the resin composition that is plasticized in a circumferential direction of the slit, and at least one lead-in path that leads the plasticized resin composition into the circumferential distribution channel, the lead-in path containing a line mixer; (3) introducing the plasticized resin composition into the lead-in path toward the circumferential distribution channel; (4) introducing the plasticized resin composition flowing through the lead-in path into the circumferential distribution channel toward the slit; and (5) introducing the resin composition flowing through the circumferential distribution channel into the slit and extruding the resin composition from an outlet of the slit into a cylindrical shape.

5 Claims, 5 Drawing Sheets

(51) Int. Cl.
  *B29C 47/10* (2006.01)
  *B29B 7/32* (2006.01)
  *B29B 7/58* (2006.01)
  *B29B 7/82* (2006.01)
  *B29K 101/12* (2006.01)
  *B29K 105/16* (2006.01)
  *B29K 507/04* (2006.01)
  *B29L 23/00* (2006.01)
  *B29L 29/00* (2006.01)

(52) U.S. Cl.
  CPC ...... *B29C 47/0004* (2013.01); *B29C 47/0023* (2013.01); *B29C 47/1063* (2013.01); *B29K 2101/12* (2013.01); *B29K 2105/16* (2013.01); *B29K 2507/04* (2013.01); *B29L 2023/00* (2013.01); *B29L 2029/00* (2013.01)

(56) References Cited

U.S. PATENT DOCUMENTS

| | | | | |
|---|---|---|---|---|
| 5,035,848 | A * | 7/1991 | Bush | B01F 5/0682 264/108 |
| 5,045,254 | A * | 9/1991 | Peelman | B29C 47/0026 264/209.2 |
| 2005/0208246 | A1 * | 9/2005 | Aisenbrey | B29C 45/0013 428/36.9 |
| 2009/0115096 | A1 * | 5/2009 | Ito | B01F 5/0451 264/241 |
| 2010/0288981 | A1 * | 11/2010 | Marcolongo | C08J 7/06 252/511 |

* cited by examiner

CYLINDRICAL EXTRUDING DIE AND METHOD FOR PRODUCING SEAMLESS TUBE

BACKGROUND OF THE INVENTION

Field of the Invention

The present disclosure relates to a cylindrical extruding die for extruding a seamless tube and to a method for producing a seamless tube.

Description of the Related Art

Electronic apparatuses, such as printers and multifunctional peripherals, use many conductive or semiconductive tube-shaped seamless members (hereinafter referred to as "seamless tube") for development, transfer, fixing, and other processes. For example, a seamless tube used as an intermediate transfer belt requires flexibility and electrical conductivity. Such seamless tubes are made of a resin composition containing a thermoplastic resin serving as a binder resin and an electronically conductive filler, such as carbon black, dispersed in the thermoplastic resin.

An example of a method for producing a seamless tube with such a resin composition includes the processes of:

(1) putting pellets made of thermoplastic resin containing an electronically conductive filler into an extruder to melt the pellets;

(2) extruding the plasticized resin composition out from a cylindrical extruding die mounted to an end of the extruder to form the plasticized resin composition into a tube; and (3) cool-solidifying the tube-shaped plasticized resin composition, with the tube shape kept, to produce a seamless tube.

Conductive seamless tubes for use in electrophotographic image forming apparatuses require uniform electrical resistance in a circumferential direction.

Japanese Patent Laid-Open No. 11-170340 discloses a method for molding a seamless tube having uniform circumferential resistance distribution through the process of extruding a thermoplastic resin composition containing a conductive filler, such as carbon particles, into a tube shape. Specifically, the method involves measuring a volume electrical resistance or a surface electrical resistance on the circumference of the cool-solidified extruded tube perpendicular to a direction in which the extruded tube is withdrawn and adjusting the temperatures of at least two portions on the circumference of the extruded molten tube on the basis of the measurements using temperature control units disposed to partially control the temperatures.

SUMMARY OF THE INVENTION

According to an aspect of the present disclosure, a cylindrical extruding die for molding a molten resin into a cylindrical seamless tube is provided. The die includes a cylindrical slit, at least one circumferential distribution channel communicating with the slit and configured to distribute the molten resin in a circumferential direction of the slit, and at least one lead-in path configured to lead the molten resin into the circumferential distribution channel. The lead-in path contains an interchanging unit configured to interchange the molten resin flowing toward the circumferential distribution channel between a flow of the molten resin near a wall of the lead-in path and a flow in a radial center of the lead-in path.

According to another aspect of the present disclosure, a method for producing an electrically conductive seamless tube containing a thermoplastic resin serving as a binder and an electrically conductive filler dispersed in the thermoplastic resin is provided. The method includes the steps of: (1) preparing an electrically conductive resin composition containing a thermoplastic resin and an electrically conductive filler; (2) preparing a cylindrical extruding die comprising a cylindrical slit, at least one circumferential distribution channel communicating with the slit and configured to distribute the resin composition that is plasticized in a circumferential direction of the slit, and at least one lead-in path configured to lead the plasticized resin composition into the circumferential distribution channel, the lead-in path containing a line mixer; (3) introducing the plasticized resin composition into the lead-in path of the cylindrical extruding die toward the circumferential distribution channel; (4) introducing the plasticized resin composition that has flowed through the lead-in path into the circumferential distribution channel toward the slit; and (5) introducing the plasticized resin composition that has flowed through the circumferential distribution channel into the slit and extruding the plasticized resin composition from an outlet of the slit into a cylindrical shape.

Another aspect of the present disclosure is directed to providing a method for easily producing an electrically conductive seamless tube in which variations in circumferential electrical resistance are reduced and a cylindrical extruding die for use in the method.

Further features, aspects and various embodiments of the present invention will become apparent from the following description of exemplary embodiments with reference to the attached drawings.

DESCRIPTION OF THE EMBODIMENTS

Figure 1:
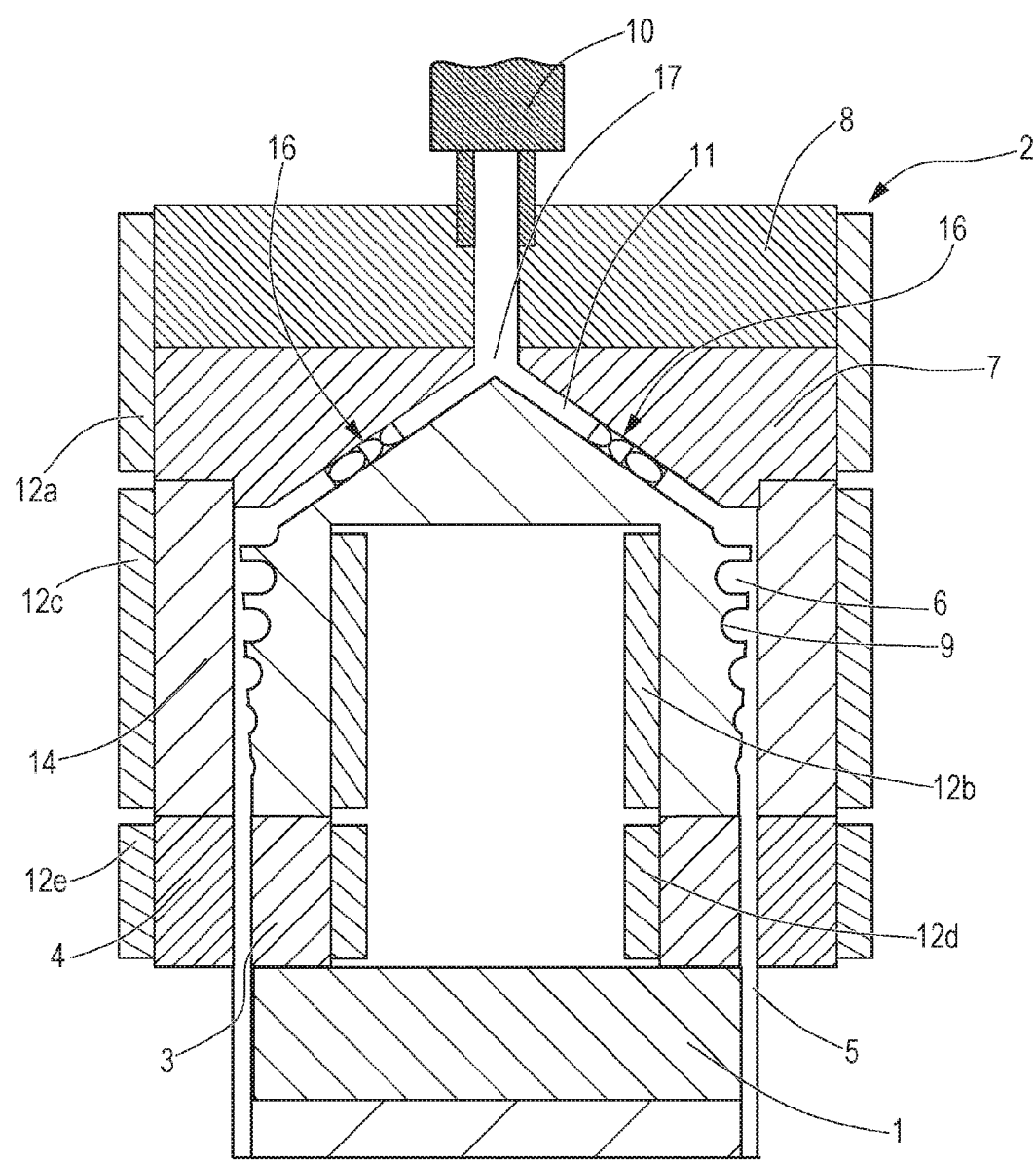
FIG. 1 is a schematic diagram illustrating a cross-sectional configuration of a cylindrical extruding die according to an embodiment of the present disclosure.

The inventors confirmed that a seamless tube in which variations in circumferential electrical resistance are reduced by the method disclosed in Japanese Patent Laid-Open No. 11-170340. However, the method disclosed in Japanese Patent Laid-Open No. 11-170340 needs to extrude a seamless tube for adjusting the temperature in advance to perform temperature settings for actual production of seamless tubes. Furthermore, even if the individual temperature control units is are adjusted before the start of production, re-adjustment may be required during the production, which requires much time and effort and reduces production efficiency.

The inventors investigated the cause of the variations in circumferential electrical resistance in a seamless tube formed by extruding a resin composition containing a conductive filler from a cylindrical extruding die.

The result shows that the variations in circumferential electrical resistance in a seamless tube formed by melt extrusion may be due to variations in total amount of distortion applied to the molten resin after the plasticized resin composition (hereinafter simply referred to as "molten resin composition") enters the cylindrical extruding die from the extruder until the composition goes out from the outlet of the cylindrical extruding die. The total amount of distortion is defined as follows. The product of the shearing speed of the molten resin composition per unit length of the channel in the cylindrical extruding die in the flowing direction of the molten resin composition and the time during which the molten resin composition moves by the unit length is defined as "sectional distortion amount". The accumulated value of the sectional distortion amounts across the entire length of the channel is defined as "total distortion amount".

The cylindrical extruding die includes a distribution channel for distributing molten resin supplied by the extruder in the circumferential direction and one or more lead-in paths for introducing the molten resin from the ejection port of the extruder to the distribution channel. The distribution channel is, for example, hanger-shaped or spiral-shaped. The cylindrical extruding die generally includes a plurality of distribution channels in view of efficient distribution of molten resin composition in the circumferential direction. In this case, the cylindrical extruding die includes a plurality of lead-in paths.

The variations in circumferential electrical resistance in seamless tubes may be mainly caused in the circumferential distribution channels, as described in paragraph [0007] of Japanese Patent Laid-Open No. 11-170340. However, the inspection performed by the inventors shows that variations in total distortion amount among the plurality of circumferential distribution channels mainly occurs in the lead-in paths. The inspection also shows that the variations in total distortion amount are due to the difference between the shearing speed of the molten resin flowing in the radial center of each lead-in path and the shearing speed of the molten resin flowing in the vicinity of the inner wall of each lead-in path. For this reason, the inventors tried to interchange the molten resin composition flowing in the vicinity of the wall of each lead-in path and the molten resin composition flowing in the radial center of the lead-in path to decrease the shearing speed of the molten resin composition flowing in the lead-in path. Specifically, the inventors disposed a line mixer, such as a static mixer, in each lead-in path to let the molten resin composition pass through the line mixer in order to interchange the molten resin composition flowing in the vicinity of the wall of the lead-in path and the molten resin composition flowing through the radial center of the lead-in path. The result shows that the variations in circumferential electrical resistance of the seamless tube can be remarkably reduced. The present disclosure is based on this finding.

Embodiments of the present disclosure will be described with reference to the accompanying drawings. In the specification and drawings, components having the same functions are denoted by the same reference signs, and duplicated descriptions thereof will be sometimes omitted.

FIG. 1 is a schematic diagram illustrating a cross-sectional configuration of a cylindrical extruding die according to an embodiment of the present disclosure. A spiral die 2 is an example of a cylindrical extruding die for molding a molten resin supplied from an extruder 10 into a seamless tube. The spiral die 2 employs an inside sizing method, in which a cooling mandrel 1 is disposed inside the tube. The spiral die 2 includes an inner lip 3 and an external lip 4 with a shape surrounding the outside of the inner lip 3.

Between the inner lip 3 and the external lip 4, a slit 5 having a cylindrical outer shape and a ring-shaped cross section is formed. The slit 5 is shaped to the shape of a seamless tube produced using the spiral die 2 and is therefore designed to dimensions required for the products.

The spiral die 2 further includes a spiral mandrel 7 and a die body 14 of a shape enclosing the outside of the spiral mandrel 7. The spiral mandrel 7A has a plurality of spiral grooves 9 on the outer peripheral surface facing the inner peripheral surface of the die body 14. In other words, spiral circular channels 6 are formed by the spiral grooves 9 and the wall surface of the die body 14 between the spiral mandrel 7 and the die body 14.

The circular channels 6 are circumferential distribution channels that communicate with the slit 5 and distribute the molten resin in the circumferential direction of the slit 5. The spiral mandrel 7 has therein a plurality of lead-in paths 11 that introduce the molten resin into the circular channels 6. The lead-in paths 11 have a circular cross section. The plurality of lead-in paths 11 communicate with one distributing portion 17.

The lead-in paths 11 each contain a line mixer 16. The line mixer 16 is a static mixer that stirs and mixes the molten resin in the lead-in path and serves as an interchanging unit that interchanges the flow of the molten resin in the center of the lead-in path 11 in the radial direction (an inner portion), that is, the radial center of the lead-in path 11, and the flow of the molten resin in the vicinity of the wall of the lead-in path 11 (an outer portion). Although this embodiment has the plurality of circular channels 6 and the plurality of lead-in paths 11 for introducing the molten resin into the individual circular channels 6, only one lead-in path 11 may be provided.

A converter 8 is disposed on the spiral mandrel 7. The converter 8 has a channel that introduces the molten resin discharged from the outlet of the extruder 10 into the distributing portion 17 of the spiral mandrel 7.

The spiral die 2 further includes casting heaters 12a to 12e and thermocouples (not shown) for controlling the temperatures of the casting heaters 12a to 12e. By controlling the casting heaters 12a to 12e, the temperatures of parts of the spiral die 2 are controlled. Specifically, the casting heater 12a is disposed in contact with the outer peripheral surface of the converter 8 and the upper peripheral surface of the spiral mandrel 7 that continues to the outer peripheral surface. The casting heater 12b is disposed in contact with the inner peripheral surface of the spiral mandrel 7. The casting heater 12c is disposed in contact with the outer peripheral surface of the die body 14. The casting heater 12d is disposed in contact with the inner peripheral surface of the inner lip 3. The casting heater 12e is disposed in contact with outer peripheral surface of the external lip 4. The thermocouples are disposed at the positions of the casting heaters 12a to 12e. The casting heaters 12a to 12e can be controlled by detecting the temperatures of the parts using the thermocouples.

Figure 2:
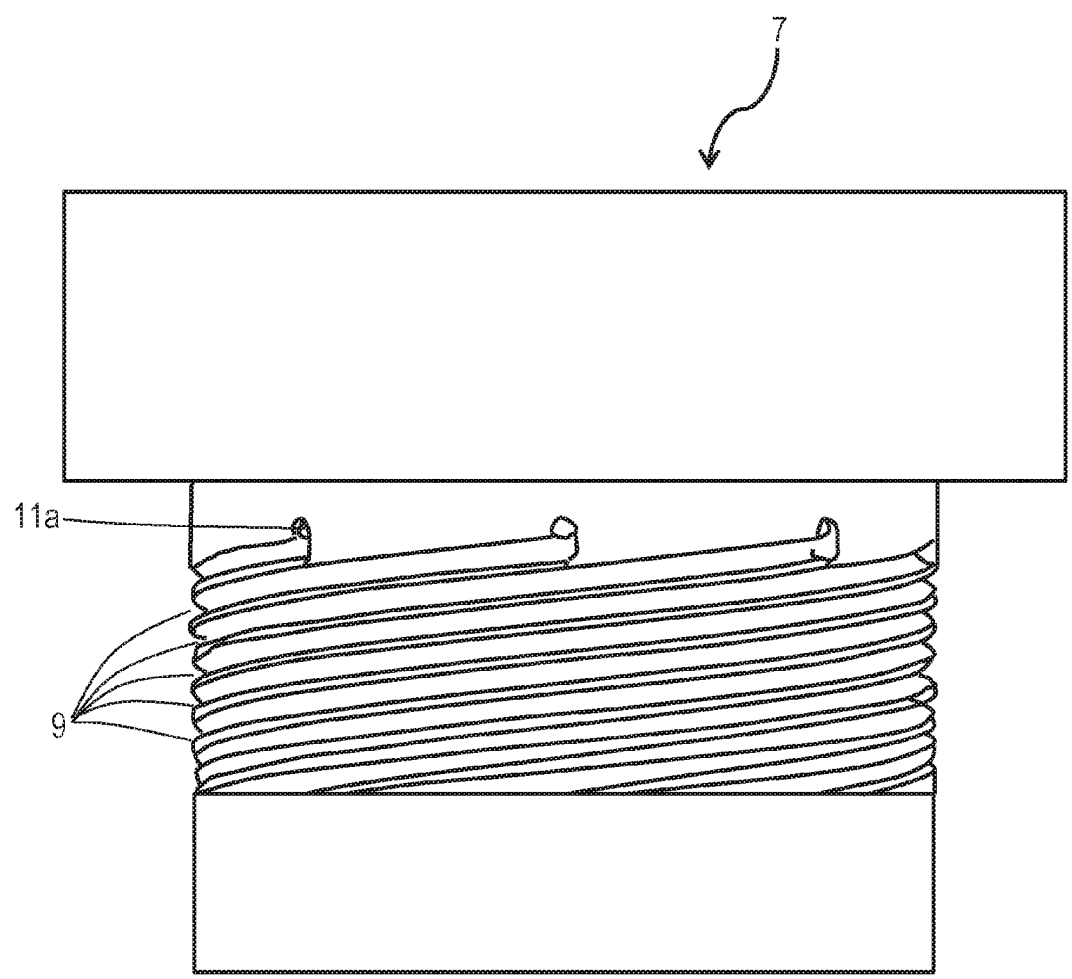
FIG. 2 is a front view of a spiral mandrel of the cylindrical extruding die shown in FIG. 1.
Figure 3:
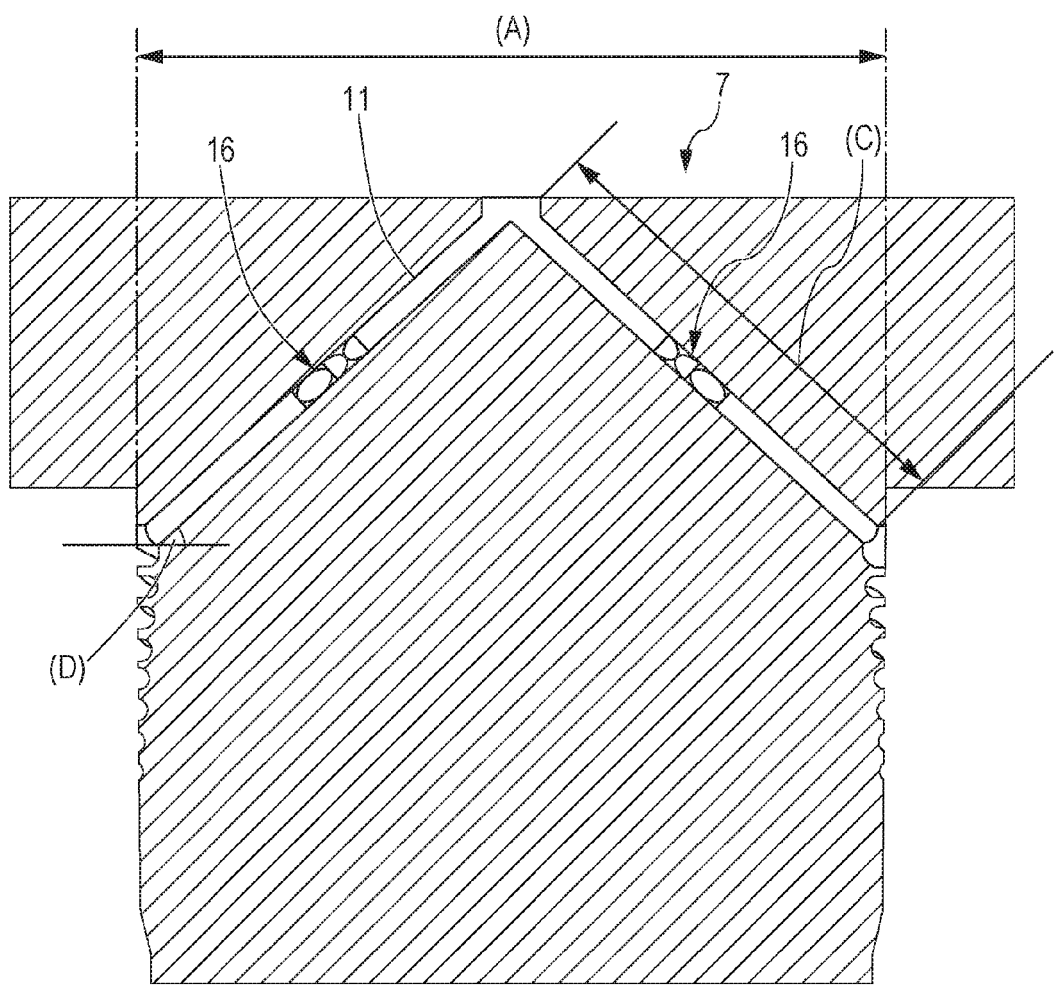
FIG. 3 is a cross-sectional view of the spiral mandrel shown in FIG. 2.

The more detailed configuration of the spiral mandrel 7 will be described with reference to FIGS. 2 and 3. FIG. 2 is a front view of the spiral mandrel 7 constituting the cylindrical extruding die 2. FIG. 3 is a cross-sectional view of the spiral mandrel 7.

Referring to FIG. 2, the spiral mandrel 7 has the plurality of spiral grooves 9 on the outer surface. The ends of the spiral grooves 9 communicate with ends 11a of the lead-in paths 11 provided in the spiral mandrel 7.

Referring to FIG. 3, each lead-in path 11 is provided with the line mixer 16. The line mixer 16 interchanges the flow of the molten resin in the center of the lead-in path 11 and the flow of the molten resin in the vicinity of the wall of the lead-in path 11 to make the total distortion amount uniform in the lead-in path 11. For this purpose, the line mixer 16 is disposed at a position at which the molten resin can be stirred and mixed so that the total distortion amount is made uniform, for example, at an intermediate position of the length along the lead-in path 11.

Referring to FIG. 1, a method for producing a seamless tube according to this embodiment will be described.

The thermoplastic resin composition containing a conductive filler is melted by heat in the extruder 10. The extruded molten resin composition passes through the channel in the converter 8 into the distributing portion 17 at the upper part of the spiral mandrel 7. The molten resin in the distributing portion 17 is introduced into the individual plurality of lead-in paths 11 communicating with the plurality of spiral grooves 9. The lead-in paths 11 are each equipped with the line mixer 16. In each lead-in path 11, the flow of the molten resin in the center of the lead-in path 11 and the flow of the molten resin in the vicinity of the wall of the lead-in path 11 are interchanged by the line mixer 16. This causes the molten resin with a high shear speed flowing through the vicinity of the wall of the lead-in path 11 to the line mixer 16 to be interchanged with the molten resin in the center of the lead-in path 11 into a flow with a low shear speed by the interchanging action of the line mixer 16. As a result, the total distortion amounts of the molten resin compositions flowing through the individual lead-in paths 11 are made uniform. This reduces variations in the total distortion amount of the resin in the circumferential direction of the seamless tube extruded from the ring-shaped slit 5, thereby reducing variations in electrical resistance.

Figure 5:
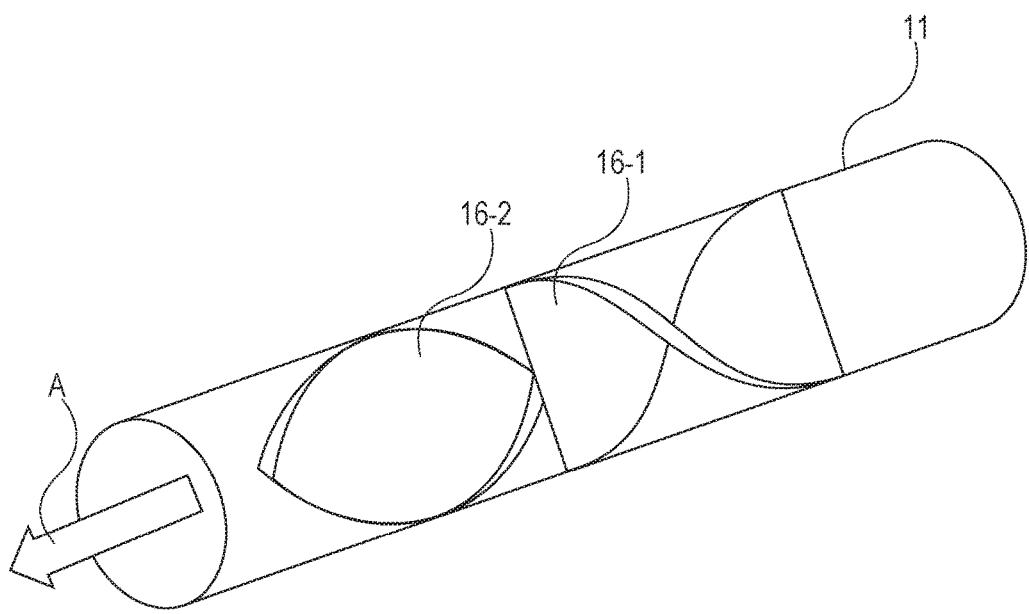
FIG. 5 is a diagram illustrating line mixers disposed in a lead-in path.

FIG. 5 is a diagram illustrating one of the line mixers 16 disposed in the spiral mandrel 7. In this embodiment, two line mixers (two static mixers) 16 are disposed in one lead-in path 11. A right element 16-1 of the line mixers 16 is disposed upstream of the flow of the molten conductive resin composition, indicated by arrow A, and a left element 16-2 is disposed downstream. However, the number of the elements of the line mixer 16 placed in the lead-in path 11 is not limited to two. Any number of elements may be disposed provided that the flow of the molten resin composition in the vicinity of the wall of the lead-in path 11 and the flow in the radial center of the lead-in path 11 can be interchanged. When the molten resin composition passes through the static mixer 16, the molten resin composition is divided into two by one static mixer element and is then reversed and divided into two by the next element. Therefore, the total number of divisions and the mixing ratio are 2 raised to the nth power, where n is the number of elements. Thus, the number of elements of the line mixer 16 disposed in the lead-in path 11 is greater than or equal to two and less than or equal to 18, preferably, greater than or equal to 4 and less than or equal to 10. Further, the right element and the left element may preferably be disposed alternately.

Next, the molten resin composition that has passed through the static mixers 16 in the lead-in paths 11 into the circular channels 6 is divided into flows along the circular channels 6 and flows leaking from the spiral grooves 9 to a lower part of the spiral die 2. The molten resin composition flows in the circumferential direction at substantially the same flow rate and pressure and passes through the ring-shaped slit 5 in the lower end surface of the spiral die 2 to have a uniform thickness in the circumferential direction. Thereafter, the resin is cooled into a seamless tube as it is withdrawn along the outer surface of the cooling mandrel 1.

The resin to be molded using the spiral die 2 contains a resin composition that contains a thermoplastic resin as the main material and a conductive filler.

Examples of the resin composition include polyethylene (high density, medium density, low density, or linear low-density), a propylene-ethylene block or a random copolymer, a rubber or latex constituent, such as ethylene-propylene copolymer rubber or styrene-butadiene rubber, a styrene-butadiene-styrene block copolymer or its hydrogen-added derivative, polybutadiene, polyisobutylene, polyamide, polyamidoimide, polyacetal, polyarylate, polycarbonate, polyphenylether, metamorphic polyphenylenether, polyimide, liquid-crystalline polyester, polyethylene terephthalate, polyetherimide, polyether either ketone, acryl, polyvinylidene fluoride, polyvinyl fluoride, an ethylene-tetrafluoroethylene copolymer, polychloroethylene, a tetrafluoroethylene-hexafluoropropylene copolymer, polytetrafluoroethylene, fluorine-containing rubber, an acrylic alkyl ester copolymer, a polyester-polyester copolymer, s polyether-ester copolymer, a polyether-amide copolymer, an olefin copolymer, and a polyurethane copolymer and a mixture thereof.

Examples of the conductive filler include carbon black, graphite, carbon fiber, metal powder, conductive metal oxide, an organometallic compound, organometallic salt, and conductive high polymer and a mixture of a plurality of materials of them.

According to an embodiment of the present disclosure, a conductive seamless tube in which variations in electrical resistance in the circumferential direction is reduced can easily be produced.

EXAMPLE

A seamless tube was molded using the spiral die 2 shown in FIG. 2. The detailed specifications of the spiral die 2 for use in molding will be shown below.

Inner lip 3: 287.25 mm diameter
External lip 4: 289.4 mm diameter

Figure 4:
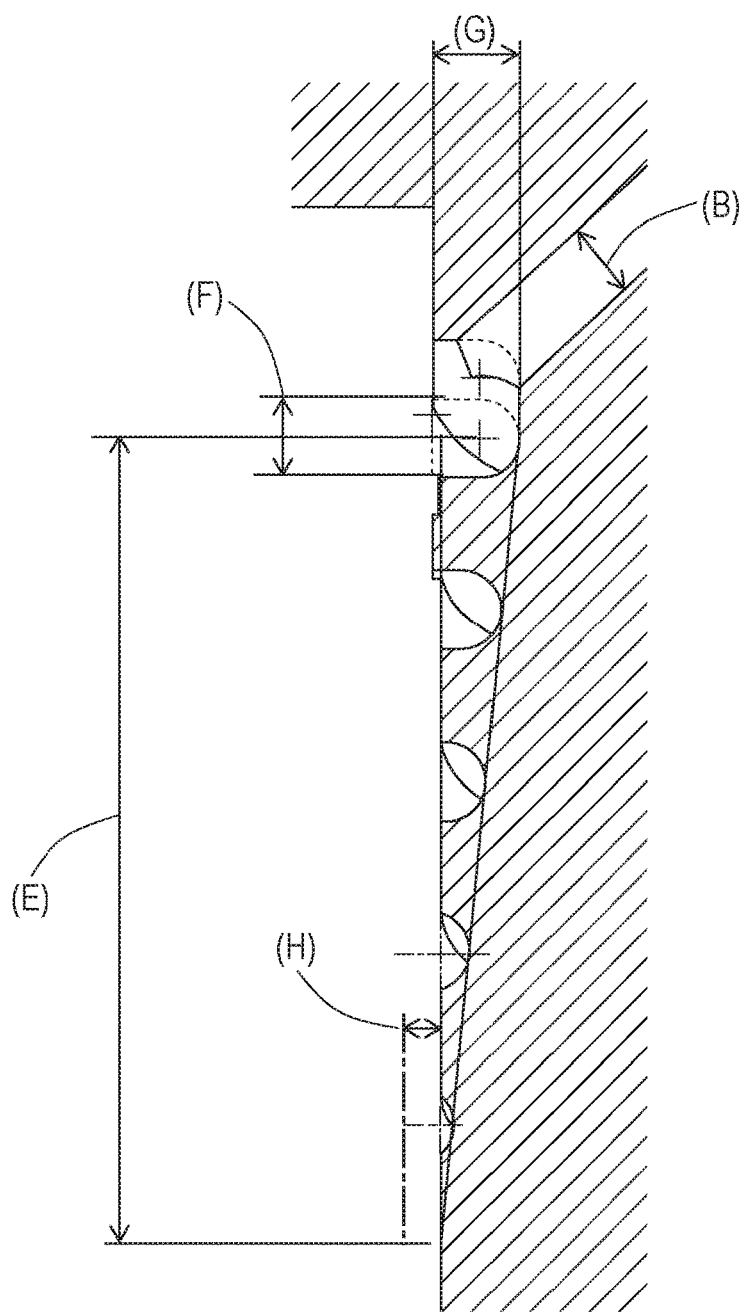
FIG. 4 is a diagram illustrating the shape of channels that the spiral grooves of the spiral mandrel form.

FIG. 4 is a diagram illustrating the shape of the channels that the spiral grooves 9 of the spiral mandrel 7 form. The specific shape of the spiral mandrel 7 will be described with reference to FIGS. 3 and 4.

The diameter (A) of the spiral mandrel 7, and the length (C) and the angle (D) of the lead-in path 11 are shown in FIG. 3. Further, the diameter (B) of the lead-in path 11, the length of the spiral portion adjacent to the outlet (E), the groove width (F), the initial groove depth (G) and the spiral end clearance (H) are shown in FIG. 4.

Spiral mandrel 7: 290 mm diameter (A)
Lead-in path 11:
(B) diameter: 9 mm, (C) length: 191 mm, (D) angle: 47.5°
Number of grooves: 8
(E) The length of the spiral portion adjacent to outlet: 96 mm
Winding angle: 360°
(F) Groove width: 9 mm
(G) Initial groove depth: 8.5 mm
(H) Spiral end clearance: 1.5 mm
Line mixer: static mixer (manufactured by Noritake Co., Limited)
Number of elements: 2 (right element: 1, left element: 1)
Element: 9 mm diameter, 1 mm thickness, 13.5 mm length
Placement position:
Distance from inlet of lead-in path 11 to inlet of line mixer 16: 85 mm
Molding Conditions:

Casting heaters 12a to 12e: 380° C. set temperature
Amount of resin flowing from extruder 10 to spiral die 2: 6 kg/h Resin composition: polyether ether ketone (product name "Victrex PEEK450P, manufactured by Victrex PLC), 80 pts. mass.

Conductive filler: carbon black (product name "Denka Black", manufactured by Denka Company Limited), 20.0 pts. mass The above resin composition and the conductive filler were dry-blended. The dry-blended material was supplied to a twin-screw extruder, where the material is melt-extruded while being kneaded or mixed at 380° C., which is higher than or equal to the melting point of resin and which does not cause thermal degradation, and the molded material is cut into pellets.

A specific procedure for molding a seamless tube will be described below. The pellets were supplied to the extruder 10 (a single-screw extruder) set at 380° C. for melting, and the molten resin was introduced into the spiral die 2. The molten resin was extruded vertically downward by the spiral die 2 into the shape of a seamless tube. The seamless tube was extended in the axial direction at an adjusted withdrawing speed from the spiral die 2 to form a seamless tube with a thickness of about 100 μm.

Under the above conditions, circumferential variations in the thickness of the molded seamless tube was 100 μm±5 μm.

The maximum value of the surface electrical resistance of the molded seamless tube in the circumferential direction was $6 \times 10^{11} \Omega/\square$, i.e. Ω/square, and the minimum value of the surface electrical resistance was $3 \times 10^{11} \Omega/\square$. In other words, the maximum value of the surface electrical resistance was within twice the minimum value. The distribution of the values of the surface electrical resistance did not exhibit prominent tendency.

With such degree of variations in surface electrical resistance, using this seamless tube as an intermediate transfer belt achieves high-definition image quality.

Comparative Example

A seamless tube was molded with the same configuration as that of the above example but without the line mixers 16 in the lead-in paths 11.

Circumferential variations in the thickness of the molded seamless tube was 100 μm±5 μm.

The maximum value of the surface electrical resistance of the molded seamless tube in the circumferential direction was $1 \times 10^{12} \Omega/\square$, and the minimum value was $1 \times 10^{11} \Omega/\square$. In other words, the minimum value of the surface electrical resistance of the molded seamless tube was very large, ten times the minimum value, and the distribution of the surface electrical resistance exhibited a waveform corresponding to the number of the spiral grooves.

This shows that providing the line mixers 16 in the lead-in paths 11, as in the above example, reduces variations in the total circumferential distortion amount of the lead-in paths 11, thereby reducing variations in the surface electrical resistance of the molded seamless tube.

As described above, the spiral die 2 according to the embodiment of the present discloser is a cylindrical extruding die for molding a molten resin into a cylindrical seamless tube. The spiral die 2 includes the cylindrical slit 5, the circular channels 6 communicating with the slit 5 to distribute a molten resin in the circumferential direction of the slit 5, and the lead-in paths 11 for introducing the molten resin to the circular channels 6. The lead-in paths 11 each include an interchanging unit for interchanging the flow of the molten resin in the center of the lead-in path 11 and the flow of the molten resin in the vicinity of the wall of the lead-in path 11.

With this configuration, the amount of distortion generated in each lead-in path 11 can be made uniform. This reduces variations in the total circumferential distortion amount of the molded seamless tube, thereby reducing variations in the value of the electrical resistance of the seamless tube in the circumferential direction. According to the embodiment, variations in the values of the electrical resistance of the seamless tube in the circumferential direction can be reduced without decreasing the production efficiency of the seamless tubes as adjustment before production is not needed.

The interchanging unit may be a line mixer. The line mixer can effectively mix the liquid flowing in the tube by the action of division, interchange, and reverse using the shape of its element. The main use of the interchanging action of the line mixer allows the molten resin to be interchanged from the center of the tube to the vicinity of the wall and from the vicinity of the wall to the center.

Thus, the simple method of disposing the line mixer in each lead-in path 11 allows the amount of distortion generated in the lead-in paths 11 to be made uniform. This reduces variations in the total circumferential distortion amount of the molded seamless tube, thereby reducing variations in the value of the electrical resistance of the seamless tube in the circumferential direction.

The spiral die 2 can be used in a method for molding a seamless tube. The method of molding includes the process of injecting a molten resin into the lead-in paths 11 that introduce the molten resin into the circular channels 6 for distributing the molten resin in the circumferential direction of the cylindrical slit 5. The molding method further includes the process of interchanging the flow of the molten resin in the center of each lead-in path and the flow of the molten resin in the vicinity of the wall of each lead-in path in an intermediate point, the process of injecting the molten resin into the slit 5 through the circular channels 6, and the process of cooling the molten resin.

The molding method allows variations in the total distortion amount of the molten resin to be reduced without the need for measuring the temperatures of parts of the spiral die 2 and adjusting temperature control units using the measurements before the start of production of seamless tubes. This reduces variations in the value of the electrical resistance of the seamless tube in the circumferential direction without decreasing the production efficiency of the seamless tube.

Modifications

Having described the present disclosure with reference to the embodiment, it is to be understood that the present disclosure is not limited to the above embodiment. It is to be understood that modifications of the configuration and the details of the present disclosure will be apparent to those skilled in the art within the scope of the technical spirit of the present disclosure.

For example, although in the above embodiment the line mixers 16 are provided in the spiral die 2 having the spiral circumferential distribution channels, the present disclosure is not limited to the embodiment. For example, the line mixer 16 may be provided not only in such an extruding die having spiral circumferential distribution channels but also in an extruding die having a cylindrical channel, such as a coat hanger die. In this case, the line mixer 16 is disposed in the lead-in path 11 that leads the molten resin into the cylindrical channel in the coat hanger die.

Although in the above embodiment the line mixer 16 is disposed in an intermediate point in the lead-in path 11 in the longitudinal direction, the present disclosure is not limited to the embodiment. The line mixer 16 can be disposed at any position at which the flow of the molten resin in the lead-in path 11 can be interchanged.

Although in the above embodiment the diameter of the cross section of the lead-in path 11 is substantially the same at the upstream side and the downstream side of the lead-in path 11, the present disclosure is not limited to the embodiment.

The lead-in path 11 may have a first portion whose cross-sectional diameter is a first value and a second portion whose cross-sectional diameter is a second value less than the first value. The line mixer 16 may be disposed in contact with a level-difference formed at the boundary between the first portion and the second portion. For example, the diameter of the first portion upstream of the lead-in path 11 may be set at 15 mm, and the diameter of the second portion downstream of the lead-in path 11 may be set at 11 mm. In this case, by bringing a cylindrical object containing the line mixer 16 into contact with the level-difference formed at the boundary between the first portion and the second portion, the line mixer 16 can be disposed in the lead-in path 11.

Although the above embodiment employs a line mixer manufactured by Noritake Co., Ltd., as the line mixer 16, the present disclosure is not limited to the embodiment. It is only required that the line mixer has the action of interchanging the flow of the molten resin in the lead-in path 11. For example, the AMX series manufactured by Apriori Corporation and a line mixer with the shape of two overlapping vanes proposed by Atect-Corporation may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-175496, filed Sep. 7, 2015, which is hereby incorporated by reference herein in its entirety.

What is claimed is:

1. A method for producing an electrically conductive seamless tube containing a thermoplastic resin serving as a binder and an electrically conductive filler dispersed in the thermoplastic resin, the method comprising the steps of:
   (1) preparing an electrically conductive resin composition containing a thermoplastic resin and an electrically conductive filler;
   (2) preparing a cylindrical extruding die comprising a cylindrical slit, a plurality of circumferential distribution channels communicating with the slit and configured to distribute the resin composition that is plasticized in a helical direction toward the slit, and a plurality of lead-in paths configured to lead the plasticized resin composition into the plurality of circumferential distribution channels, each of the plurality of lead-in paths containing a line mixer;
   (3) introducing the plasticized resin composition into the plurality of lead-in paths of the cylindrical extruding die toward the plurality of circumferential distribution channels;
   (4) introducing the plasticized resin composition that has flowed through the plurality of lead-in paths into the plurality of circumferential distribution channels toward the slit; and
   (5) introducing the plasticized resin composition that has flowed through the plurality of circumferential distribution channels into the slit and extruding the plasticized resin composition from an outlet of the slit into a cylindrical shape,
   wherein
      the step (3) comprises a step of interchanging the plasticized resin composition flowing through the plurality of lead-in paths between a flow near a wall of the plurality of lead-in paths and a flow in a radial center of the plurality of lead-in paths by the line mixers disposed in the plurality of lead-in paths,
      the plurality of lead-in paths has a circular cross section.

2. The method for producing a seamless tube according to claim 1, wherein the conductive filler comprises carbon black.

3. The method for producing a seamless tube according to claim 1, wherein the line mixer comprises a static mixer.

4. The method for producing a seamless tube according to claim 3, wherein the static mixer comprises at least one and at most 9 elements comprising a right element and a left element.

5. The method for producing a seamless tube according to claim 4, wherein the right element and the left element are alternately disposed.

* * * * *